United States Patent [19]

Berger

[11] Patent Number: 5,477,037
[45] Date of Patent: Dec. 19, 1995

[54] FINANCIAL DOCUMENT DISPENSING APPARATUS AND METHOD

[75] Inventor: Caesar Berger, Woodland Hills, Calif.

[73] Assignee: Computer Based Controls, Inc., Agoura Hills

[21] Appl. No.: 212,687

[22] Filed: Mar. 11, 1994

Related U.S. Application Data

[63] Continuation of Ser. No. 84,086, Jun. 28, 1993, abandoned, which is a continuation of Ser. No. 784,310, Oct. 30, 1991, abandoned.

[51] Int. Cl.⁶ .............................. G06F 15/21; H04L 9/00
[52] U.S. Cl. .................... 235/379; 340/825.34; 283/57; 283/58; 364/479; 364/401; 209/583; 400/207; 902/18; 902/24; 902/36; 380/23; 380/24; 380/25
[58] Field of Search ...................... 235/381, 379; 364/308, 479, 401; 340/825.34; 283/57, 58; 209/583; 400/207; 902/18, 24, 36; 380/23, 24, 25

[56] References Cited

U.S. PATENT DOCUMENTS

| | | | |
|---|---|---|---|
| 3,814,227 | 6/1974 | Hurd, III et al. | |
| 4,053,735 | 10/1977 | Foudos | 235/61.9 R |
| 4,321,672 | 3/1982 | Braun et al. | 364/408 |
| 4,722,444 | 2/1988 | Murphy et al. | 209/583 |
| 4,870,596 | 9/1989 | Smith | 364/479 |
| 4,970,655 | 11/1990 | Winn et al. | 364/479 |
| 4,995,315 | 2/1991 | Koper et al. | 101/96 |
| 5,377,271 | 12/1994 | Foreman et al. | 380/51 |

*Primary Examiner*—Viet Q. Nguyen
*Attorney, Agent, or Firm*—Pretty, Schroeder, Brueggemann & Clark

[57] ABSTRACT

A dispenser produces negotiable money orders, traveler's checks, and the like at remote locations and prints the check amount on the check while also printing summary data of a day's activities on a blank check form, eliminating the need for a separate printer and paper supply. The dispenser prints the check amount using print icons that form a part of each character in the check amount, but are not as large as a complete character or as small as a dot print element. The check forms are connected together by perforation ties, and the dispenser feeds the forms to the printer such that the force with which the dispenser holds the forms is greater than the force needed to tear apart the forms, thus reducing the risk of unauthorized pulling of blank forms from the dispenser.

26 Claims, 3 Drawing Sheets

5,477,037

FINANCIAL DOCUMENT DISPENSING APPARATUS AND METHOD

This application is a continuation of a prior application, application Ser. No. 08/084,086, filed Jun. 28, 1993, which is a continuation application of prior application Ser. No. 07/784,310, filed on Oct. 30, 1991, both now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to dispensing machines for financial documents and, more particularly, to an apparatus and method for dispensing negotiable money orders and traveler's checks, as well as non-negotiable credit card and debit card receipts, at a plurality of locations.

2. Description of the Related Art

A wide variety of dispensing machines are available for producing financial instruments such as debit card charges, money orders, and traveler's checks. Some machines must be manually operated, and typically include movable printing elements and a printing control arm. When a money order or check is to be printed, for example, a clerk places a blank form in the machine, positions the printing elements according to the requested amount, and actuates the printing control arm. The printing control arm causes the printing elements to be pressed against the blank form, imprinting the requested amount. After the clerk or other authorized person endorses the money order, it is negotiable and can be redeemed by the indicated payee.

Such manually operated machines are very slow, do not provide much security against forgery or unauthorized use, depend on manual entry and reporting, and require the presence of a clerk. Because a clerk is required to operate the manual machine, a remote service location or after-hours service is impossible. Furthermore, transaction records must be manually entered to a data center or directly to the financial institution issuing the check. Accordingly, automatic dispensing machines have been created in which the operator of the machine is the person who wants the completed money order or traveler's check, and in which transaction records are automatically provided to the issuing financial institution. Security against unauthorized use is improved, and transaction records are more easily and accurately maintained.

Automatic dispensing machines are typically computer controlled and are connected to a data center or financial institution by communication lines over which data is sent and received. In operation, a user's identity and bank account information is verified and then the user indicates the requested amount of the money order or traveler's check. After the computer system has verified the user's available funds, the requested amount is printed on a blank, negotiable money order or traveler's check and the completed form is dispensed from the machine. At a predetermined time, typically the end of each business day, the machine prints out a summary of its day's transactions and provides the information to the data center or financial institution.

While such automatic dispensing machines are an improvement on previous manual methods, such machines can be somewhat slow in printing. Often, such machines use printers with standard dot matrix-type print heads that move along the length of the check and imprint the checks with the check amount in what is commonly referred to as portrait mode. In portrait mode, the print head travels across the check and prints alphanumeric characters that are readable in the direction of print head travel. That is, the characters are printed to be readable along a line that is perpendicular to the direction of paper travel. Ordinarily, the printer receives ASCII-type data designating the characters to be printed and includes the necessary data to activate the proper dot matrix print elements to form the characters and print them along the check and across the direction of paper travel. Thus, for example, the printer simply requires the 8-bit ASCII code for the letter "A" to print an "A" in portrait mode.

Alternatively, the checks can be dispensed lengthwise in what is commonly referred to as landscape mode. In landscape mode, the characters are printed to be readable along a line that is parallel to the direction of paper travel. Print heads must print across the direction of paper travel. Therefore, to print in landscape mode, a printer must perform a conversion routine to essentially rotate the characters relative to the line of printing so they come out on the paper so as to be readable in the direction of paper travel. Printing in landscape mode is not especially quick because of the conversion process and is often much slower than printing in portrait mode.

As an alternative to printing in portrait or landscape mode, the characters can be printed in what is known as graphics mode. In graphics mode, the character information provided to the printer indicates the particular dot matrix print elements that will be activated for printing. This is ordinarily used for printing graphic images from a video screen, for example, and is even slower than landscape mode. Graphics mode does not deal with a regular set of alphanumeric data, where the input for the letter "A" is simply the 8-bit ASCII code for an "A" but is a lengthy string of bits for activation of the proper individual printing elements. This mode is sometimes used when large, over-sized characters are desired in addition to conventional ASCII character sets. Graphics mode is typically even slower than landscape mode. The data sent to the printer in graphics mode is of relatively low information density when compared to the character-oriented portrait mode. Faster printing times would improve the performance of such automatic dispensing machines.

One of the advantages of automatic dispensing machines is that they automatically keep track of transaction data and periodically print out a summary of the day's transactions to provide a written record. Conventionally, a second printer is provided in the dispenser and prints a transaction summary in portrait mode on a roll of blank paper. Unfortunately, this means the dispensing machine must be loaded with both blank check forms and transaction summary paper. This requires inefficient duplication of printing elements and two kinds of paper supply.

Finally, automatic money order dispensing machines are not immune from tampering. Blank check forms are most conveniently provided as a series of checks separated by perforations and arranged in a fan-fold stack. When an imprinted check is being dispensed from the machine, one end of the check can be grabbed hold of and the stack of checks can be pulled out quickly before the dispenser has stopped the paper advancement. Extra blank check forms can sometimes be retrieved in this way and the blank checks can be filled in with desired amounts and then cashed by unwary clerks. Because the dispensing machines do not require a clerk for operation, such tampering can be carried out without the immediate knowledge of authorized personnel. While missing checks can be tracked by their serial numbers, the tampering might easily escape detection until the unauthorized checks have been cashed.

From the foregoing discussion, it should be apparent that there is a need for an automatic dispensing machine that can be used at a plurality of separate locations, can quickly and accurately print the necessary data on the face of a blank form, can print transaction summaries, and can do so without inefficient duplication of elements and supplies. The present invention satisfies this need.

SUMMARY OF THE INVENTION

The present invention is embodied in a dispensing machine that can be placed at remote locations and that quickly prints characters on negotiable check draft and non-negotiable charge receipt blank forms and, at the end of a predetermined period of time, prints out machine activity reports on a blank form, eliminating the need for a second printer and paper supply for the reports. Preferably, the drafts and receipts are dispensed lengthwise, and printing is carried out with the draft or charge amount printed along the length of the form in landscape mode and activity reports printed across the form in portrait mode.

The blank forms are advantageously provided in a continuous fan-fold stack, individual forms being connected together at their ends by perforation ties that can be pulled apart. In another aspect of the invention, the printer uses a paper feed mechanism in which the force with which the paper is held by the paper feed mechanism during printing and paper advancement with a force that is set to be greater than the force needed to pull apart the forms. Thus, anyone attempting to pull out several blank forms from the dispensing end during the printing process will only succeed in pulling out a single form, which will not be properly completed or will be completed with only the requested amount. All other blank forms will remain in the printer.

The amount of a check that is to be cashed is preferably printed in oversized characters using print character icons rather than standard alphanumeric characters in landscape mode or oversized characters using dot matrix patterns in graphics mode. The print icons are portions of complete characters, not as small as the individual dot elements of a dot matrix printer such as must be specified in graphics mode or as complete as the alphanumeric characters of an ASCII character set such as must be specified in landscape mode. Rather, a number of the icons can be combined to form the desired complete characters. This allows printing to proceed more quickly than using graphics data or printing characters in landscape mode.

The dispensing machine includes a digital processor for processing user commands and controlling machine operation, and comprises a terminal connected to a data center or a financial institution to request account balance inquiries, send activity data, and send and receive various other data and commands. As many dispensing machines can be connected to the data center as can be accommodated by the data center itself. The machine also includes a keyboard for entering input data and a display screen for displaying system messages, entered data, and instructions.

Preferably, the fan-fold check forms are provided with alignment holes at the form ends. The printer checks for the presence of a hole and thereby aligns the forms properly relative to the printing elements. This is superior to conventional black stripe detectors because more expensive reflective sensors as used with such detectors are not necessary, and instead relatively simple light detectors or mechanical elements can be used. Extra security is also provided because such alignment holes easily provide speed data to the dispenser. If the dispenser becomes aware that paper is travelling at a faster rate than normal, indicating that someone is attempting to pull out blank checks, the dispenser can lock the paper against advancement.

Other features and advantages of the present invention should be apparent from the following description of the preferred embodiment, which illustrates, by way of example, the principles of the invention.

DESCRIPTION OF THE PREFERRED EMBODIMENTS

Figure 1:
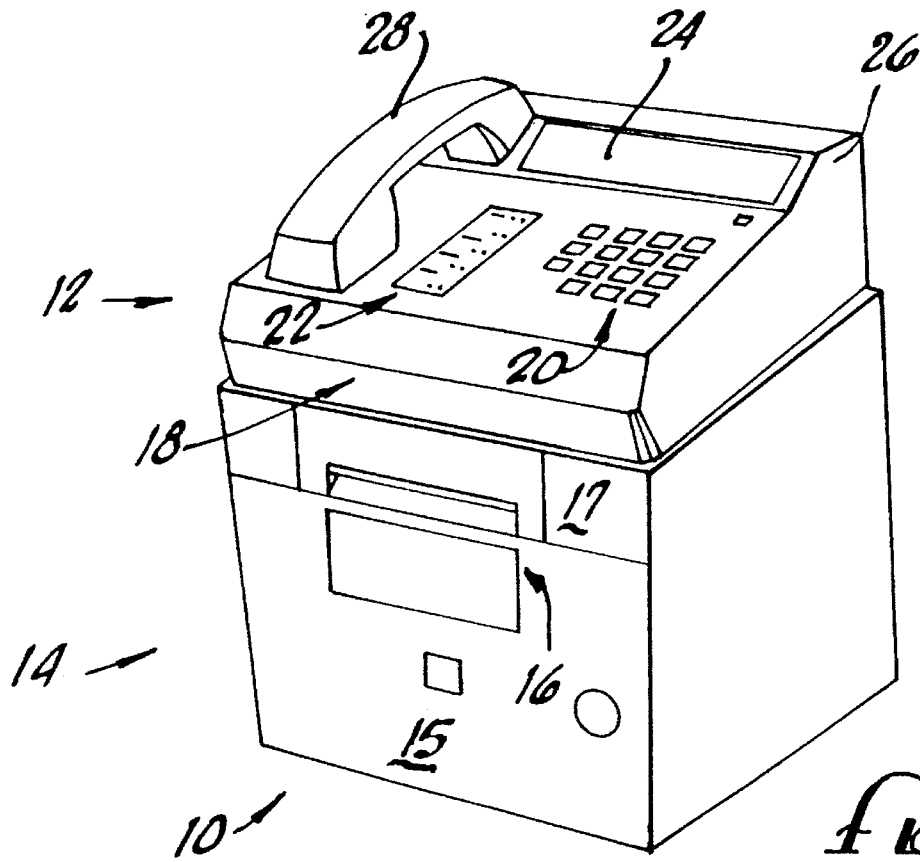
FIG. 1 is a perspective view of an automatic money order/traveler's check dispenser in accordance with the present invention.

Referring to FIG. 1, an automatic money order/traveler's check dispensing machine 10 constructed in accordance with the present invention includes a communications terminal 12 and a printer unit 14. The communications terminal communicates with a data center or a financial institution to process transaction data generated by operation of the machine. A user enters data, including account identification and the requested check amount, through the communications terminal. After the machine performs user identity and account verification, the printer unit prints the requested check amount onto a blank check form stored within the printer unit and dispenses the completed check lengthwise from a dispensing slot 16. At the end of a predetermined time interval, such as at the end of a business day, the printer unit causes a transaction summary to be printed onto one or more of the blank check forms. Thus, a single printer and paper supply are used for printing both checks and transaction summaries. This reduces the cost of the dispensing machine and also reduces the cost of supplies.

The communications terminal 12 includes a keyboard 18 with a numeric keypad 20 and assorted function keys 22 that are used for entering check requests and transaction data. The terminal is provided with a display 24 at which entered data, system commands, and instructions are displayed. Data also can be entered by using a card slot 26, which receives magnetic cards that are encoded with data. Finally, a telephone handset 28 is provided for direct verbal communication with personnel at the data center. Telephone dialing is accomplished with the keypad 20 or automatically using pre-programmed keys.

The printer unit 14 includes a base 15 that receives a plurality of blank forms with pertinent data pre-printed on the forms. A pivotable cover or lid 17 provides access to the interior of the base so that fan-fold stacks of blank forms can be placed in the base. When additional blank forms are to be loaded, the communications terminal 12 can be lifted from where it conveniently rests on the printer unit 14, as illustrated in FIG. 1. After the lid 17 is raised and the blank forms are loaded, the lid can be closed and, if desired, the communications terminal can be placed on the printer unit once again.

Figure 2:
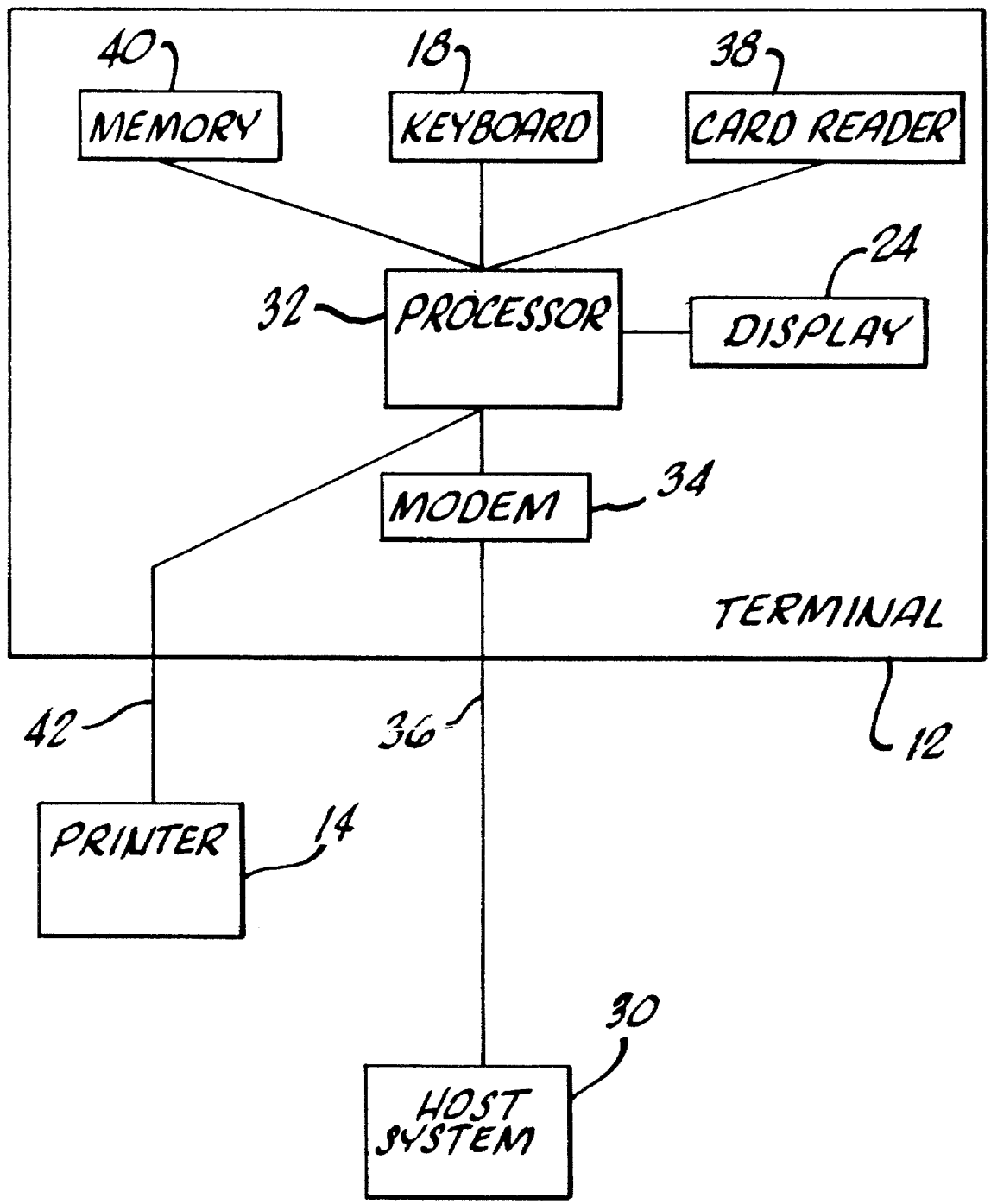
FIG. 2 is a block diagram of the dispenser shown in FIG. 1.

A better understanding of the dispensing machine operation can be gained by referring to FIG. 2, which is a block diagram that shows the dispensing machine 10 connected to a printer 14 and to a host data center or financial institution 30. Each dispensing machine includes a processor 32 that receives operator input data from the keyboard 18 or card slot 26. The processor communicates with the host computer 30 via a modem 34 and a communications line 36, which allows the dispensing machine to communicate with the host computer to send and receive transaction data, commands, and other necessary information.

The dispensing machine 10 also includes a card reader 38 through which the dispensing machine accepts information encoded on a magnetic card that is passed through the card slot 26 illustrated in FIG. 1. The card reader reads the information that is magnetically encoded on the card, such as identification data and card expiration status. The card reader can be used, for example, to charge a user's credit card or debit card for the amount of dispensed checks. Thus, a user can obtain traveler's checks in amounts greater than the user's cash-on-hand. If the user requests checks in an amount greater than the user's credit limit, the dispensing machine halts processing and indicates an error on the display 24. The dispenser 10 further includes a memory unit 40 that stores transaction data, acceptable security codes, and other data necessary for operation of the system.

The printer 14 is connected to the dispenser by a printer cable 42. The processor 32 organizes the data to be printed into the proper format, whether it is check amount data or transaction summary data. As noted, the check amount is printed using icons. The processor accepts the check amount indicated from the keyboard 18, formats it into the proper representation, and provides it to the printer 14 via the printer cable 42. The processor 32 also performs various administrative functions, such as beginning operation by accepting security code data from authorized personnel, verifying user identification, and controlling the periodic summary transaction reports delivered to the host computer.

Figure 3:
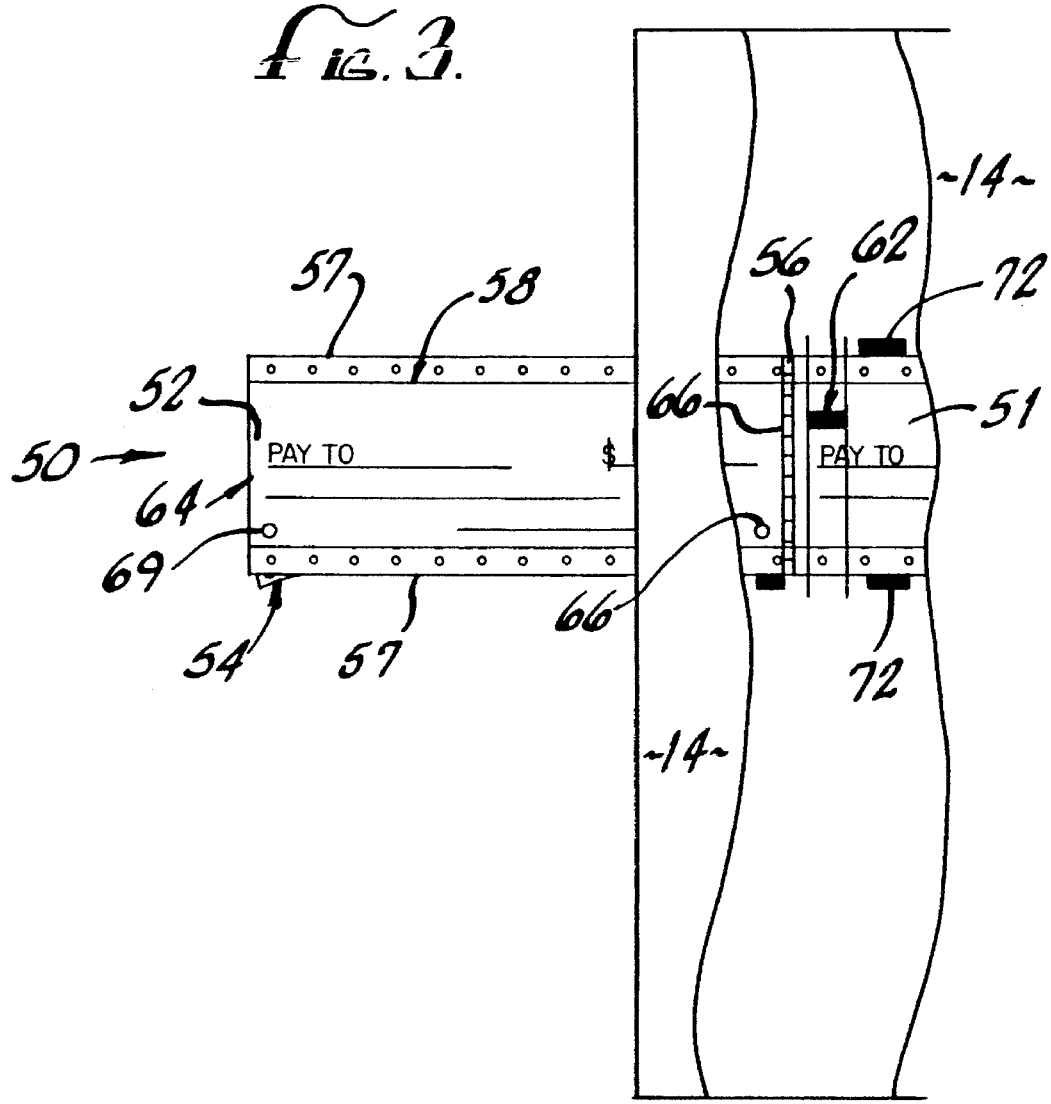
FIG. 3 is a partial cut-away view of the printer showing of checks as they are dispensed from the dispenser shown in FIG. 1.

A completed check 50 is shown being dispensed from the printer 14 in FIG. 3. The check is a multiple-part form comprising an original top layer 52 and a duplicate non-negotiable form 54 backing layer that is retained as a receipt by the customer. Preferably, a carbonless paper multiple-part form is used, eliminating the need to dispose of waste carbon layers and reducing the chances of copies being smudged. The check forms are provided in a continuous fan-fold stack in which individual forms 50 and 51 are connected by perforation ties 56. Strips of paper 57 with sprocket-receiving holes are attached by perforations to the top and bottom edges of the check forms. A tractor feed mechanism, known to those skilled in the art, is used to advance the forms through the printer, but other printer mechanisms, such as friction feed, can also be used.

As noted above, using blank check forms to print both completed checks and transaction summaries reduces the cost of the apparatus 10 and the cost of supplies. Using multiple-part forms, such as illustrated in FIG. 3, further provides transaction summaries that are easier to read. Generally, the top layer 52 of a multiple-part form includes identifying marks, patterns, watermarks, printed information, and the like that are absent from the backing layer 54, which can comprise a blank sheet. The contrast between the printed characters and the paper is thereby improved. Thus, characters that are impressed from the printer 14 onto the backing layer generally can be more easily read than characters that are printed on the top layer. Thus, the backing layers of multiple-part forms provide an easily read copy of the transaction summaries.

FIG. 3 shows that the check amount is printed lengthwise along the check, parallel to the top edge 58 and bottom edge 60 of the check. Printing is performed by a dot matrix print head 62 having a plurality of printing elements extending across the check. The print head 62 comprises a single row of four printing elements, or pins, providing a resolution of, for example, 64 dots per inch (DPI). It should be understood that other print head configurations can also be used. The print head 62 is supported above a blank check form 51 by two rails 63, along which the print head is swept back and forth across the check while the printing elements are selectively activated. In this way, dots that form characters and images can be printed on the check.

As noted, the printer 14 can include either a conventional friction feed or tractor feed mechanism advancing the check forms past the print head 62. In either case, the forms 51 are held as they are advanced with a force that is greater than the force needed to break the perforation ties 56. In this way, anyone attempting to pull extra blank forms out of the printer 14 when a check is being printed will only succeed in pulling out the single completed check 50, and the remaining blank checks will stay in the printer.

Because checks are removed from the printer unit 14 as they come out of the slot 16, the forward edge 64 of a check 50 is the first edge to leave the printer. The rear edge 66 of the check is adjacent with the next appearing blank check form 51. One end of the check is provided with an alignment hole, such as the hole 68 shown near the rear edge 66. The alignment hole is used by a sensor 70 to detect the end of a check form and monitor both the registration of the check relative to the print head 62 and the paper speed of the checks being printed. A forward alignment hole 69 can be provided alternatively or additionally to check for the forward edge of the forms. In this way, printing can begin with the very first form in the stack.

The sensor 70 is preferably a simple optical sensor that receives light from a light source (not illustrated) when an alignment hole 68 or 69 is positioned between the light source and the sensor. When the sensor detects an alignment hole, it provides a signal to the processor 32, which causes feeding of check forms to stop in a position that gives proper registration to the forms relative to the print head 62 so that printing will occur on the proper blank lines of the check 51. The sensor 70 is also used to prevent tampering. Depending on the number of checks requested, printing can proceed at up to approximately eight checks per minute. The sensor 70 provides a signal to the processor as each check is printed, and therefore the processor can quickly determine if a check has passed by faster than possible by printing with the print head 62. This indicates tampering, and the processor responds to such an indication by locking the feed mechanism with a pair of solenoids 72.

Figure 4:
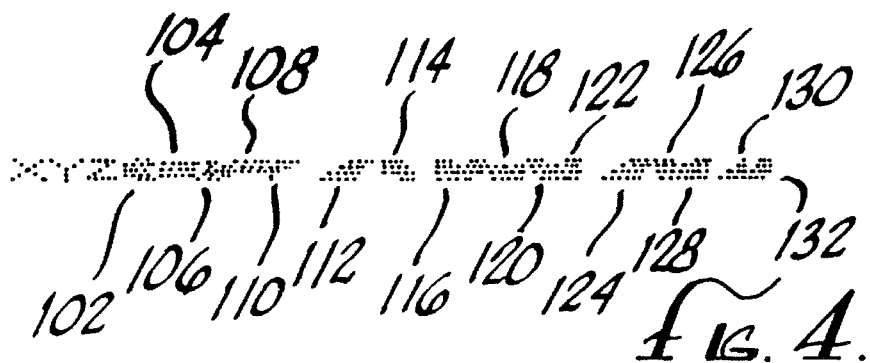
FIG. 4 is a diagram of the letters X, Y, and Z and also the printing icons printed by the print head of the dispenser shown in FIG. 1.
Figure 5:
FIG. 5 is the numeral "8" as printed using the print icons shown in FIG. 4.

FIG. 4 illustrates the sixteen character icons 102–132 used in printing the checks 50, preceded by three alphanumeric characters X, Y, and Z, printed in portrait mode by the printer unit 14. FIG. 5 shows the numeral 8, printed using the icons. The icons are created by providing the printer with data that will form the desired icons. Conventional print head assemblies include memory for the storage of data that will form standard characters. The icon data is stored in one of two ways, depending on the capabilities of the printer unit 14.

Many printers are capable of supporting only a standard ASCII character set, which consists of approximately 128 characters. Many of these characters are seldom used. If the printer unit 14 has only such 128-character capability, then the icons are created by replacing the character data corresponding to some of the ASCII-standard but seldom-used alphanumeric characters with icon data. More specifically, standard software code supplied with a commercially available dot matrix printer assembly includes stored data that causes the printing of the particular dot pattern associated with each character of a standard ASCII alphanumeric character set. The icon character set of the preferred embodiment includes sixteen icons. Therefore, in accordance with the present invention, the data for sixteen of the ASCII characters is replaced with the data for the sixteen icons 102–132. When the printer unit 14 is instructed by the processor 32 (FIG. 2) to print one of the sixteen replaced characters, an appropriate icon is printed instead. In this way, the printer unit operates as it otherwise would when printing a standard alphanumeric character in portrait mode, but instead prints an icon.

For example, the character "&" is not ordinarily used in printing machine activity data. Therefore, the stored data ordinarily used by the printer 14 for generating the "&" character is replaced with the data for one of the icons 102–132 and the printer is instructed to print that character when the icon is desired. The icons can be used to print characters that are oriented as if printed in the landscape mode, so they can be read lengthwise along the check, even though the printing is actually carried out in portrait mode. By organizing the print data in this way, the printing of checks can proceed faster than if alphanumeric data were sent to the printer for printing or if graphic data were provided to the printer for printing in graphics mode.

Some of the more advanced printer assemblies available are capable of supporting a 256-character alphanumeric set. Such a printer therefore supports approximately 128 characters in addition to the standard 128 ASCII characters. If the printer unit 14 has a 256-character capability, then the icon data can be stored in the printer memory for the unused 128 non-ASCII characters. Regardless of the printer capability, those skilled in the art will recognize that a great number of icons can be supported by printer units of either capability described above. In the preferred embodiment, however, only sixteen icons are necessary.

Figure 6:
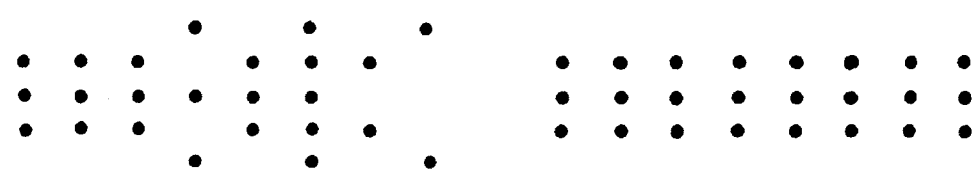
FIG. 6 is an enlarged and exaggerated representation of two of the printing icons shown in FIG. 4.

FIG. 6 illustrates two of the print icons 102 and 104 shown in FIG. 4, but in greater detail and with the distance between the dots made by the printing elements exaggerated for clarity. The maximum allowable print area is seven dots high by eight dots wide. Because the print head 62 (FIG. 3) includes eight printing elements, the icons 102–132 are created in up to two passes of the print head, as are conventional alphanumeric characters in portrait mode. Forming the desired alphanumeric characters, oriented as if printed in landscape mode, is simply a matter of providing the printer with instructions to print the proper sequence of standard portrait mode keyboard characters whose print data have been replaced with the icon print data. Thus, although from the printer's perspective the printing is being done in portrait mode, the characters actually come out in landscape orientation. Because the portrait mode is used, printing proceeds more quickly than if graphics mode was used. When activity data is printed, the data is printed using the standard ASCII input characters in portrait mode, which are smaller in size and require only one pass of the print head 62 to print. The check amount characters, such as shown in FIG. 5, can require up to five passes of the print head. In this way, a greater amount of activity information can be printed than if the information were printed lengthwise with larger characters.

Those skilled in the art will appreciate that the dispenser 10 can be used for producing debit charge and credit card receipts in addition to producing negotiable financial instruments such as money orders and traveler's checks. The blank forms used by the dispenser would likely be changed to print credit card receipts, but the structural details of the dispenser would remain the same and the advantages discussed above would be obtained.

An automatic negotiable draft and non-negotiable receipt dispenser in accordance with the present invention provides a terminal that communicates with a data center or financial institution and a printer that prints out completed drafts and receipts on blank forms using print icons that create alphanumeric characters lengthwise along the forms and that also prints out transaction summary reports in portrait mode on blank forms. The forms used to print out the transaction summary reports are voided. Using the same printer and the same paper supply to print out completed drafts or receipts and transaction summary reports reduces the number of elements needed for the printer and reduces the supply costs. A processor contained within the terminal advantageously tends to switching between completed-form printing and transaction summary printing modes.

Appendix A is the assembly code listing for the data needed to generate the print icons 102–132 shown in FIG. 4. Large-size and medium-size numerals are provided by the code. The reference to landscape mode refers to the orientation of the printed characters and not to the printing mode. The characters are printed with the printer unit 14 in portrait mode.

The present invention has been described above in terms of presently preferred embodiments so that an understanding of the present invention can be conveyed. There are, however, many configurations for dispensing machines not specifically described herein, but with which the present invention is applicable. The present invention should therefore not be seen as limited to the particular embodiments described herein, but rather it should be understood that the present invention has wide applicability with respect to dispensing machines. Such other configurations can be achieved by those skilled in the art in view of the description herein.

APPENDIX A

© 1991 Computer Based Controls, Inc.
;---------------------------------------------------------------

; string of characters to form
; large zero in landscape mode

```
LANDOL:  DB    88H         ;column 1
         DB    89H
         DB    89H
         DB    89H
         DB    89H
         DB    8EH DB    87H         ;column 2
         DB    FC
         DB    FC
         DB    FC
         DB    80H DB    86H         ;column 3
         DB    85H
         DB    85H
         DB    85H
         DB    84H DB    'zero '     ;column 4
         DB    ENDDEL      ;end delimiter
```

;---------------------------------------------------------------

;string of characters to form
;large one in landscape mode

```
        LAND1L:
                DB      8CH             ;column 1
                DB      85H
                DB      85H
 5              DB      85H
                DB      8BH
                DB      8AH
                DB      20H             ;column 2
                DB      20H
10              DB      20H
                DB      20H
                DB      20H DB      87H             ;column 3
                DB      20H
15              DB      20H
                DB      20H
                DB      20H DB      'one '          ;column 4
                DB      ENDDEL          ;end delimiter 20      ;- - - - - - - - - - - - - - - - - - - - - - - - - E N D
        ONE---------------------------------------
                ;string of characters to form
                        ;large two in landscape mode LAND2L: DB      8FH             ;column 1
25              DB      89H
                DB      8EH
                DB      20H
                DB      8EH DB      87H             ;column 2
```

```
             DB    20H
             DB    80H
             DB    20H
             DB    80H

5          DB    87H          ;column 3
             DB    20H
             DB    80H
             DB    85H
             DB    84H 10          DB    'two '        ;column 4
             DB    ENDEL         ;end delimiter ;- - - - - - - - - - - - - - - - - - - - - - - - - - - - - E N D
TWO---------------------------------------
             ;string of characters to form
 15          ;large three in landscape mode LAND3L:    DB    88H           ;column 1
             DB    20H
                DB   20H
             DB    20H
 20          DB    8EH DB    87H           ;column 2
             DB    20H
             DB    FCH
             DB    20H
 25          DB    80H DB    86H           ;column 3
             DB    85H
             DB    FB4
             DB    85H
```

```
        DB      84H

DB      'three'         ;column 4
        DB      ENDDEL          ;end delimiter ;---------------------------- E N D
THREE-------------------------------------
        ;string of characters to form
            ;large four in landscape mode LAND4L: DB      20H             ;column 1
        DB      80H
        DB      83H
        DB      82H
        DB      20H DB      20H             ;column 2
        DB      80H
        DB      20H
        DB      81H
        DB      82H DB      94H             ;column 3
        DB      94H
        DB      89H
        DB      89H
        DB      89H DB      'four '         ;column 4
        DB      ENDDEL          ;end delimiter ;---------------------------- E N D
FOUR--------------------------------------
        ;string of characters to form
            ;large five in landscape mode
```

```
       LAND5L:   DB    88H          ;column 1
                 DB    20H
                 DB    80H
                 DB    89H
   5             DB    9AH DB    87H          ;column 2
                 DB    20H
                 DB    80H
                 DB    20H
  10             DB    80H DB    86H          ;column 3
                 DB    85H
                 DB    84H
                 DB    20H
  15             DB    80H DB    'five '      'column 4
                 DB    ENDDEL       'end delimiter ;- - - - - - - - - - - - - - - - - - - - - - - - - E N D
       FIVE----------------------------------------
  20             ;string of characters to form
                 ;large six in landscape mode LAND6L:   DB    88H          ;column 1
                 DB    89H
                 DB    9AH
  25             DB    89H
                 DB    8EH DB    87H          'column 2
                 DB    20H
```

```
           DB    80H
           DB    20H
           DB    80H

DB    86H        ;column 3
           DB    85H
           DB    84H
           DB    20H
           DB    84H DB    'six '     ;column 4
           DB    ENDDEL     ;end delimiter ;- - - - - - - - - - - - - - - - - - - - - - - - E N D
SIX---------------------------------------
           ;string of characters to form
                ;large seven in landscape mode LAND7L:    DB    20H        ;column 1
           DB    20H
           DB    20H
           DB    20H
           DB    80H DB    89H        ;column 2
           DB    82H
           DB    20H
           DB    20H
           DB    80H DB    20H        ;column 3
           DB    20H
           DB    82H
           DB    85H
           DB    84H
```

```
        DB    'seven'         ;column 4
        DB    ENDDEL          'end delimiter ;- - - - - - - - - - - - - - - - - - - - - - - - - E N D
 SEVEN----------------------------------------
        ;string of characters to form
            ;large eight in landscape mode LAND8L: DB    88H             ;column 1
        DB    89H
        DB    9AH
        DB    89H
        DB    8EH DB    87H             ;column 2
        DB    20H
        DB    80H
        DB    20H
        DB    80H DB    86H             ;column 3
        DB    85H
        DB    9BH
        DB    85H
        DB    84H DB    'eight'         ;column 4
        DB    ENDDEL          ;end delimiter ;- - - - - - - - - - - - - - - - - - - - - - - - - E N D
 EIGHT----------------------------------------
        ;string of characters to form
            ;large nine in landscape mode LAND9L: DB    88H             ;column 1
```

```
              DB    20H
                    DB    88H
              DB    89H
              DB    8EH

5           DB    87H          ;column 2
              DB    20H
              DB    87H
              DB    20H
              DB    80H 10           DB    86H          ;column 3
              DB    85H
              DB    8CH
              DB    85H
              DB    84H 15           DB    'nine '      ;column 4
              DB    ENDDEL       ;end delimiter ;---------------------------END NINE------------------------------------
        ;string of characters to form
 20     ;medium zero in landscape mode LANDOM: DB  88H          ;column 1
              DB    89H
              DB    8EH DB    86H          ;column 2
 25           DB    85H
              DB    84H
              DB    ENDDEL       ;end delimiter

;----------------------------END   M
```

```
         ;ZERO------------------------------------
              ;string of characters to form
                   ;medium one in landscape mode LAND1M:   DB    85H           ;column 1
   5              DB    85H
                  DB    8BH DB    20H           ;column 2
                  DB    20H
                  DB    20H
  10              DB    ENDDEL        ;end delimiter ;-------------------------- E N D   M
         ONE------------------------------------
              ;string of characters to form
                   ;medium two in landscape mode 15     LAND2M:   DB    8FH           ;column 1
                  DB    87H
                  DB    8EH DB    87H           ;column 2
                  DB    86H
  20              DB    84H
                  DB    ENDDEL        ;end delimiter ;--------------------------- E N D   M
         TWO------------------------------------
              ;string of characters to form
  25               ;medium three in landscape mode LAND3M:   DB    88H           ;column 1
                  DB    20H
                  DB    80H
```

```
              DB      86H             ;column 2
              DB      84H
              DB      81H
              DB      ENDDEL          ;end delimiter 5    ;- - - - - - - - - - - - - - - - - - - - END   M
      THREE-----------------------------------
              ;string of characters to form
                 ;medium four in landscape mode LAND4M: DB      20H             ;column 1
10            DB      8AH
              DB      20H DB      85H             ;column 2
              DB      9CH
              DB      8BH
15            DB      ENDDEL          ;end delimiter ;- - - - - - - - - - - - - - - - - - - - END   M
      FOUR------------------------------------
              ;string of characters to form
                 ;medium five in landscape mode 20    LAND5M: DB      88H             ;column 1
              DB      80H
              DB      9AH DB      86H             ;column 2
              DB      84H
25            DB      80H
              DB      ENDDEL          ;end delimiter

;- - - - - - - - - - - - - - - - - - - - END   M
```

```
                    FIVE--------------------------------------
                        ;string of characters to form
                            ;medium six in landscape mode LAND6M:     DB      88H             ;column 1
5                   DB      9AH
                    DB      8EH DB      86H             ;column 2
                    DB      84H
                    DB      84H
10                  DB      ENDDEL          ;end delimiter ;-------------------------------- END  M
        SIX---------------------------------------
                        ;string of characters to form
                            ;medium seven in landscape mode 15      LAND7M:     DB      20H             ;column 1
                    DB      20H
                    DB      80H DB      89H             ;column 2
                    DB      89H
20                  DB      81H
                    DB      ENDDEL          ;end delimiter ;------------------------------ END  M
        SEVEN-------------------------------------
                        ;string of characters to form
25                          ;medium eight in landscape mode LAND8M:     DB      88H             ;column 1
                    DB      9AH
                    DB      8EH
```

```
            DB    86H        ;column 2
            DB    9BH
            DB    84H
            DB    ENDDEL     ;end delimiter 5   ;- - - - - - - - - - - - - - - - - - - - - E N D   M
     EIGHT----------------------------------------
            ;string of characters to form
                ;medium nine in landscape mode LAND9M: DB    88H        ;column 1
10          DB    80H
            DB    8EH DB    86H        ;column 2
            DB    9BH
            DB    84H
15          DB    ENDDEL     ;end delimiter
```

I claim:

1. A dispenser for printing both negotiable instruments and transaction summaries, comprising:

a terminal by which a dispenser operator enters transaction data corresponding to desired issuance of a printed negotiable instrument;

a printer that receives blank negotiable instrument forms, the printer issuing the printed negotiable instruments and also printing the transaction summaries, both on the blank negotiable instrument forms;

wherein the printer prints upon the blank negotiable instrument forms in landscape format to issue the printed negotiable instruments, and upon the blank negotiable instrument forms in portrait format to print the periodic transaction summaries; and, a data processor that is coupled to the terminal to receive the transaction data, and that directs the printer to issue the printed negotiable instruments in response to the transaction data, compiles the periodic transaction summaries representing the issuance of one or more negotiable instruments, and periodically directs the printer to print the transaction summaries.

2. A dispenser according to claim 1, wherein the data processor includes software that causes the printer to print the transaction summaries following passage of a predetermined time interval.

3. A dispenser according to claim 1, wherein:

the dispenser further comprises a card reader that accepts a card having encoded information and that reads therefrom the encoded information, and a modem that is utilized by the data processor to selectively couple the dispenser to a financial institution associated with the encoded information; and the data processor communicates with the financial institution to verify the card and encoded information.

4. A dispenser according to claim 1, further comprising a memory unit that is operatively connected to the data processor and that stores security codes for authorized dispenser operators.

5. A dispenser according to claim 1, wherein the data processor includes software that causes the data processor to accept and verify security code data from authorized dispenser operators, verify user identification by communication with a financial institution, and control the delivery of periodic summary transaction reports to a host computer.

6. A dispenser according to claim 1, further comprising icon means for printing in the landscape format using print icons.

7. A dispenser according to claim 1, further comprising switching means for switching between negotiable instrument printing and transaction summary printing modes.

8. A dispenser according to claim 1, wherein:

the printer includes means for receiving a fanfold arrangement of blank negotiable instrument forms and for advancing the same during printing to permit withdrawal of printed negotiable instruments; and the dispenser further comprises locking means for selectively retaining blank negotiable instrument forms with a force that is greater than the force needed to break perforation ties of the fanfold arrangement.

9. A dispenser according to claim 1, wherein:

the printer receives a fanfold arrangement of blank negotiable instrument forms and includes a feed mechanism that advances the blank negotiable instrument forms during printing;

the dispenser further comprises a mechanism that selectively engages the fanfold arrangement and causes separation between a printed negotiable instrument and the fanfold arrangement negotiable instrument forms when the printed negotiable instrument is pulled from the dispenser faster than advancement of the fanfold arrangement by the feed mechanism.

10. A dispenser for dispensing a printed negotiable instrument, comprising:

a terminal by which a dispenser operator enters transaction data corresponding to the desired issuance of the printed negotiable instrument;

a printer that prints alphanumeric characters upon a blank negotiable instrument form to thereby issue the printed negotiable instrument;

a data processor that is coupled to the terminal to receive the transaction data, and to output electronic data representing the alphanumeric characters;

one of the data processor and the printer includes an array of alphanumeric characters including both normal characters for printing in portrait format and also print icons, representing characters oriented ninety degrees relative to the normal size characters, corresponding to landscape format;

wherein the printer prints the alphanumeric characters upon the blank negotiable instrument.

11. A dispenser according to claim 10, wherein:

the printer selectively prints the alphanumeric characters in one of enlarged and normal sizes;

the array of print icons provides, when the printer selectively prints the alphanumeric characters in enlarged size; and wherein the printer receives the prints icons and print alphanumeric characters represented thereby upon the blank negotiable instrument in enlarged size.

12. A dispenser according to claim 11, wherein the printer includes an electronic memory that stores the array.

13. A dispenser according to claim 12, wherein the memory of the printer includes writable memory locations that may be written to by software to each store a pattern representing a particular print icon.

14. A dispenser according to claim 12, wherein the memory of the printer includes memory locations that correspond to seldom used alphanumeric characters of the United States of America Standard Code For Information Interchange format that are selectively replaced with data corresponding to print icons.

15. A dispenser according to claim 14, wherein the printer includes at least sixteen memory locations that are replaced with data corresponding to print icons.

16. A dispenser according to claim 11, wherein the array of print icons is configured such that the printer operates as it otherwise would when printing an alphanumeric character in normal size in portrait format, but instead prints a plurality of icons that cooperate to form enlarged size alphanumeric characters in landscape format.

17. A dispenser according to claim 11, wherein:

the dispenser further comprises a card reader that accepts a card having encoded information and that reads therefrom the encoded information, and a modem that is utilized by the data processor to selectively couple the dispenser to a financial institution associated with the encoded information; and the data processor communicates with the financial institution to verify the card and encoded information.

18. A dispenser according to claim 11, wherein:

the printer includes means for receiving a fanfold arrangement of blank negotiable instrument forms and for advancing the same during printing to permit withdrawal of printed negotiable instruments; and the dispenser further comprises locking means for selectively retaining blank negotiable instrument forms with a force that is greater than the force needed to break perforation ties of the fanfold arrangement.

19. A dispenser according to claim 10, wherein:

the printer receives a fanfold arrangement of blank negotiable forms and is controlled by the data processor to sequentially print upon the blank negotiable forms to thereby issue the printed negotiable instruments, the printer having a feeder mechanism that advances the negotiable instruments in a manner that prevents an individual from removing a negotiable instrument form, other than during the directed issuance of printed negotiable instruments by the data processor, the feeder mechanism including a sensor mechanism that provides a signal indicative of the speed of advancement of the fanfold arrangement;

a feed mechanism having both a locked state, wherein the fanfold arrangement may not be advanced within the printer, and also in an unlocked state wherein the fanfold arrangement may be advanced within the printer such that the negotiable instruments may be issued from the printer; and, a comparator mechanism coupled to the feed mechanism, the comparator mechanism receiving said signal indicative of the speed of advancement and causing the feed mechanism to enter the locked state when the speed of advancement of the fanfold arrangement exceeds a predetermined rate, and the unlocked state when the speed of advancement of the fanfold arrangement as determined from the signal does not exceed the predetermined rate.

20. A dispenser according to claim 19, wherein:

said sensor mechanism includes an optical sensor that is positioned adjacent an advancement path of the blank negotiable instrument forms to detect the forms during printing and that provides a signal to the data processor as each negotiable instrument is printed; and the feed mechanism includes a pair of solenoids that are selectively moved between the locked and unlocked states by the comparator mechanism.

21. A dispenser according to claim 19, wherein the comparator mechanism includes software of the data processor operating to receive the signal from the sensor and determine whether an alignment mark has been sensed by the sensor; and move the feed mechanism to the locked state if a predetermined number of alignment marks have been detected during a predetermined interval of time.

22. A dispenser according to claim 19, further comprising icon means for printing in the landscape mode using print icons.

23. A dispenser according to claim 19, further comprising transaction summary printing means for controlling the printer to selectively print both negotiable instruments, in landscape format, and transaction summaries, in portrait format.

24. A dispenser according to claim 11, further comprising communication means for sending a summary of transaction data and operations stored in the data processor during a predetermined time interval to a data center.

25. A dispenser according to claim 11, wherein a plurality of the print icons represent a portion of an alphanumeric character of enlarged size, which is thereby formed by a combination of the plurality of the print icons.

26. A dispenser according to claim 10, wherein:

the printer receives a fanfold arrangement of blank negotiable instrument forms and includes a feed mechanism that advances the blank negotiable instrument forms during printing;

the dispenser further comprises a mechanism that selectively engages the fanfold arrangement and causes separation between a printed negotiable instrument and the fanfold arrangement negotiable instrument forms when the printed negotiable instrument is pulled from the dispenser faster than advancement of the fanfold arrangement by the feed mechanism.

* * * * *